(12) United States Patent
Sang et al.

(10) Patent No.: US 10,555,355 B2
(45) Date of Patent: *Feb. 4, 2020

(54) ON-DEMAND RECONFIGURABLE CONTROL PLANE ARCHITECTURE (ORCA) INTEGRATING MILLIMETER-WAVE SMALL CELL AND MICROWAVE MACRO CELL

(71) Applicant: MEDIATEK INC., Hsinchu (TW)

(72) Inventors: Aimin Justin Sang, San Diego, CA (US); Yuanyuan Zhang, Beijing (CN); Yu-Syuan Jheng, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 61 days.

This patent is subject to a terminal disclaimer.

(21) Appl. No.: 15/697,620

(22) Filed: Sep. 7, 2017

(65) Prior Publication Data

US 2017/0374703 A1 Dec. 28, 2017

Related U.S. Application Data

(63) Continuation of application No. PCT/CN2015/077425, filed on Apr. 24, 2015.

(51) Int. Cl.
*H04W 4/00* (2018.01)
*H04W 76/15* (2018.01)
(Continued)

(52) U.S. Cl.
CPC .............. *H04W 76/15* (2018.02); *H04W 8/18* (2013.01); *H04W 76/27* (2018.02)

(58) Field of Classification Search
CPC ......... H04W 8/18; H04W 8/22; H04W 48/08; H04W 48/20; H04W 76/02;
(Continued)

(56) References Cited

U.S. PATENT DOCUMENTS 9,370,020 B2 * 6/2016 Zou .................... H04W 72/0426
9,713,129 B2 * 7/2017 Cordeiro .............. H04B 7/0689
(Continued)

FOREIGN PATENT DOCUMENTS

CN 102405672 A 4/2009
CN 102256266 A 7/2011
(Continued)

OTHER PUBLICATIONS

Ishii et al, A Novel Architecture for LTE-B-C-plane/U-plane Split and Phantom Cell Concept, IEEE, 7 pages, 2012.*
(Continued)

*Primary Examiner* — Frank Duong
(74) *Attorney, Agent, or Firm* — Imperium Patent Works; Zheng Jin

(57) ABSTRACT

Millimeter-wave (mmWave) band communication is a very promising technology for 5G small cells. In practice, such a new system will coexist with legacy or evolved microwave band systems, such as E-UTRAN LTE macro-cell cellular systems, for a long time to come. Considering the typical scenarios where a macro cell offers umbrella coverage for clusters of small cells, several control plane (C-plane) architectural choices of macro-assisted 5G mmWave systems from both UE and network's perspectives are evaluated. Termed macro-assisted mmWave, an effective end-to-end integration of the futuristic mmWave small cells and microwave macro cells shall promise the benefits of both yet avoid individual limitations. The proposed On-demand Reconfiguration C-Place Architecture (ORCA) for Macro-assisted Millimeter Wave (mmWave) small cells is designed to meet 5G expectations of dense deployment of small cells and UEs and beamformed intermittent Gbps links.

24 Claims, 10 Drawing Sheets

(51) Int. Cl.
*H04W 76/27* (2018.01)
*H04W 8/18* (2009.01)

(58) Field of Classification Search
CPC . H04W 76/025; H04W 76/04; H04W 76/046; H04W 76/15; H04W 76/27
See application file for complete search history.

(56) References Cited

U.S. PATENT DOCUMENTS

| | | | |
|---|---|---|---|
| 2012/0044824 A1 | 2/2012 | Österling et al. | 370/252 |
| 2014/0004863 A1 | 1/2014 | Zhang et al. | 455/444 |
| 2014/0192740 A1 | 7/2014 | Ekpenyong et al. | 370/329 |
| 2014/0220974 A1 | 8/2014 | Hsu | 455/436 |
| 2014/0328190 A1 | 11/2014 | Lord et al. | 370/252 |
| 2015/0124748 A1 | 5/2015 | Park et al. | 370/329 |
| 2015/0334734 A1 | 11/2015 | Park et al. | 370/329 |
| 2017/0265121 A1* | 9/2017 | Barberis | H04W 72/082 |
| 2017/0331670 A1* | 11/2017 | Parkvall | H04W 52/0274 |

FOREIGN PATENT DOCUMENTS

| | | |
|---|---|---|
| WO | WO2014109568 A1 | 1/2013 |
| WO | WO2014181176 A1 | 5/2013 |
| WO | WO2015065129 A1 | 11/2013 |

OTHER PUBLICATIONS

Brahmi et al, Summary on preliminary trade-off investigations and first set of potential network-level solutions, ICT-317669-METIS/D4.1, 96 pages, Apr. 2014.*
Zakrzewska et al, Dual Connectivity in LTE HetNets with Split Control- and User-Plane, 6 pages, IEEE, 2013.*
Di Girolamo, INFSO-ICT-317941 iJOIN D5.1, Revised definition of requirements and preliminary definition of the iJOIN architecture, iJOIN, 107 pages, Oct. 2013.*
International Search Report and Written Opinion of International Search Authority for PCT/CN2015/077425 dated Jan. 26, 2016 (11 pages).
EPO, search report for the EP patent application 15889547.4 dated Mar. 2, 2018 (11 pages).

* cited by examiner

SCENARIO #D

SCENARIO #E

ON-DEMAND RECONFIGURABLE CONTROL PLANE ARCHITECTURE (ORCA) INTEGRATING MILLIMETER-WAVE SMALL CELL AND MICROWAVE MACRO CELL

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2015/077425, with an international filing date of Apr. 24, 2015. This application is a continuation of International Application No. PCT/CN2015/077425, which is pending as of the filing date of this application, and the United States is a designated state in International Application No. PCT/CN2015/077425. The disclosure of each of the foregoing documents is incorporated herein by reference.

TECHNICAL FIELD

The disclosed embodiments relate generally to wireless communication, and, more particularly, to control plane architecture integrating Millimeter Wave smallcell and microwave macrocell.

BACKGROUND

The upcoming next generation "5G" Millimeter Wave (mmWave) small cell is expected to coexist with microwave (E-UTRAN) macro cells for a long time. The macro-assisted mmWave cellular systems exploit the fact that mmWave small cells and microwave macro cells may compensate each other very well in coverage area, link capacity, spectrum availability, and service robustness.

The mmWave bands above 10 GHz offer abundant spectrum, possibly at license free or at least efficiently shared, where bands may span contiguously for hundreds of megahertz or even gigahertz. Comparatively, microwave bands below 6 GHz are known for suffering from shortage, known as "bandwidth crunch", and are fragmented bands of tens of megahertz with expensive licensing.

Due to the high carrier frequency, an mmWave system enjoys the natural compactness of RF system design of potentially tens or hundreds of antennas in a very small area, but it also has the physical barriers of poor penetration, small channel coherence time, big propagation loss due to atmosphere gaseous losses and precipitation attenuation. That is why mmWave systems usually need highly directional beamforming techniques to meet the tight link budget even for a small cell coverage. Comparatively, microwave systems have much smaller propagation path loss, and hence wider coverage, but greater multipath dissipation and scattering that may translate to severe inter-cell interference.

Given different channel characteristics, at the radio access system level, mmWave systems may promise gigabit-rate links within limited (small cell) coverage that are yet coupled with challenging beam-tracking and intermittent links in low-to-medium mobility in particular. On the other hand, the legacy microwave systems offer proven record of robust wide-area coverage, e.g., macrocell services even for high mobility users at a service rate of up to hundreds of megabits.

From both network and radio access's perspectives, mmWave is currently considered a very promising choice for in-door or out-of-door "5G" cellular small cells, which may compensate microwave macro-cell in shortage of spectrum or in need for economical high-speed data services. In particular, the small cells offer downlink (DL) throughput boosting or coverage extension for an umbrella macro-cell at its edge. On the other hand, macro-cell coverage makes up mmWave's directional coverage limitation and bursty link disruption by offering reliable omni-directional overlay services for time-critical or mission-critical control signaling, or offering more robust and seamless services for low-rate high-mobility voice users. Together they constitute a layered communication infrastructure that promise reliability, wide coverage, economical yet diversified mobile QoS services.

The gradual deployment of mmWave small cell systems, just as many other previous wireless systems, may initially be standalone Greenfield or macro-assisted hotspots, then clusters of contiguous small cells overlaid on top of existing macro cells, and eventually large scales of dense deployment of mmWave small cells to host many stationary or mobile users, e.g., in stadiums or urban areas under a central controller.

Overall, macro-assisted mmWave small cells demand a scalable multi-RAT integration architecture that affect both UE and networks. Control and data plane shall be separated because they may not always go through the same radio access. Design of control and user plane architecture shall be scalable and consider 5G mmWave deployment scenarios. Clustered or Dense deployment of mmWave small cells under the coverage of a macrocell with the following characteristics shall be focused on: UEs are of dual active RFs in mmWave band and microwave bands; no ideal backhaul link between small cell BS (SBS) and macrocell BS (MBS); dense mmWave small cells and UEs under an umbrella microwave macrocell; mmWave smallcell is similar to LTE at upper layers but like a new RAT otherwise at lower layers; and Gbps rate of mmWave links but with intermittent connectivity.

The existing LTE DuCo architecture is not fine-tuned for mmWave small cells that has new radio characteristics and faces new 5G requirements as well. The LTE DuCo architecture is designed only for some less dense deployed, relatively low-rate microwave smallcell scenarios, and not fine-tuned for stationary or dense scenarios with Gbps mmWave small cells. A control plane architecture to integrate mmWave small cells and microwave macrocell effectively is sought.

SUMMARY

A control plane architecture to integrate Millimeter Wave (mmWave) small cells and microwave macro-cells effectively is proposed. The architecture keeps the same underlying hardware (HW) architecture intact, but overlay on top of it multiple logical C-plane architecture setups by on-demand software (SW) configuration. The proposed On-demand Reconfiguration C-Place Architecture (ORCA) for Macro-assisted mmWave small cells is designed to meet 5G expectations of dense deployment of small cells and UEs and beamformed intermittent Gbps links. Although mmWave small cells may work independently, macro-assisted mmWave systems offer the following potential advantages: more robust mobility support, resilience to mmWave link outage, small-area throughput boosting and wide-area signaling coverage. In light of the 5G expectation and macro-assistance, the deployment scenarios are classified based on density and UE's mobility level. Such criteria helps to evaluate any specific system architecture with respect to each specific scenario or all scenarios.

In one embodiment, a first C-plane setup is applied for dense stationary UEs where control signaling is offloaded from macro base station (MBS) to mmWave smallcell base stations (SBSs). A second C-plane setup is applied for high-mobility UEs where robust control signaling is provided by MBS. A third C-plane setup is applied for dual-RF low-mobility UEs capable of refined RRM split where dual connection signaling paths are provided by both MBS and mmWave SBSs.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
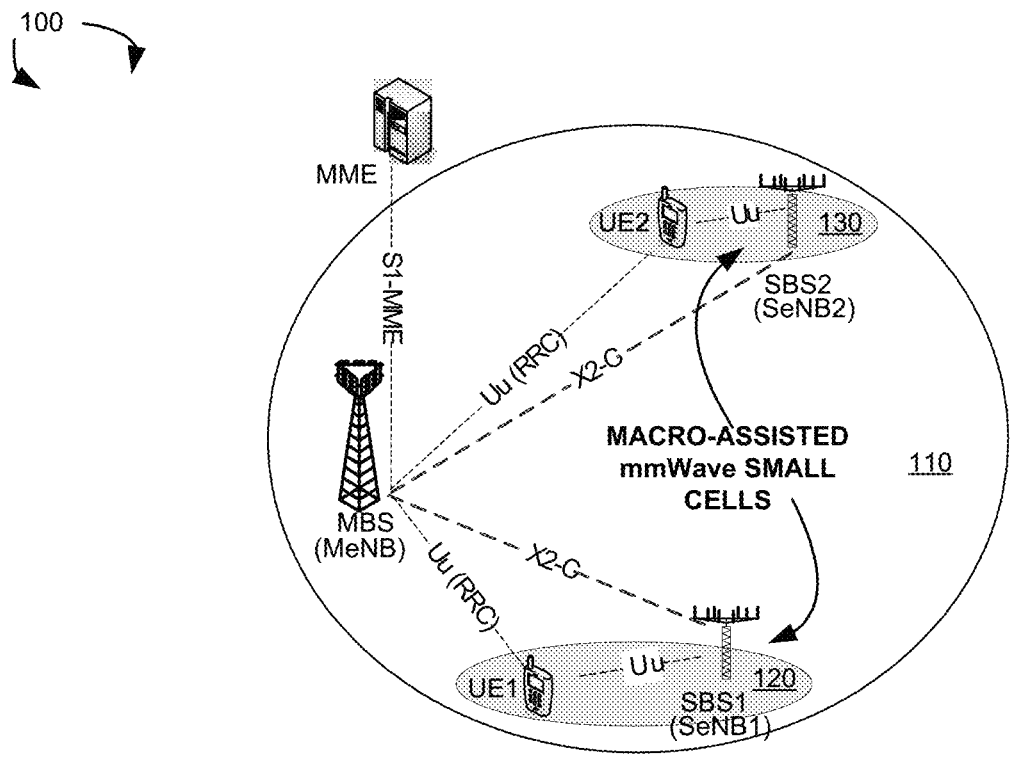
FIG. 1 illustrates a heterogeneous network (HetNet) with On-demand Reconfiguration C-Place Architecture (ORCA) for Macro-assisted Millimeter Wave (mmWave) small cells in accordance with one novel aspect.

FIG. 1 illustrates a heterogeneous network (HetNet) 100 with On-demand Reconfiguration C-Place Architecture (ORCA) for Macro-assisted Millimeter Wave (mmWave) small cells in accordance with one novel aspect. HetNet 100 comprises a macro base station (MeNB or MBS) serving a macrocell 110 and a plurality of mmWave smallcell base stations (Secondary eNB (SeNB) or SBS) including SBS1 and SBS2 serving small cells. The mmWave small cells are deployed under the coverage of the macrocell 110. User equipment UE1 is initially located within smallcell 120 served by SBS1 while UE2 is initially located within smallcell 130 served by SBS2. In a typical Clustered or Dense deployment of mmWave smallcell scenario, a cluster of or dense mmWave small cells and UEs are under the umbrella microwave macrocell 110.

The existing LTE 3GPP HetNet dual connectivity (DuCo) architecture is designed only for less dense deployed, relatively low-rate microwave smallcell scenarios that is not fine-tuned for stationary or dense scenarios with Gbps mmWave small cells. The 3GPP HetNet DuCo defines control-plane and user-plane split with single radio resource control (RRC) for HetNet mobility, and flow/bearer data split. In control plane, control signaling with RRC/S1-MME anchor is at the macrocell only. The single RRC anchor provides simple and robust handover (HO) but no diversity, single failure point at the macro base station with X2 latency. The control plane is not designed to handle very dense deployment of small cells, UEs, and many intermittent links with signaling errors. In the example of FIG. 1, according to LTE DuCo control plane architecture, the MeNB provides the single RRC anchor for all UEs in mmWave small cells. Given intermittent dense mmWave links, the MeNB may see signaling storms or potential control latency for UEs. The single RRC anchor provides no C-plane diversity for UEs in reaction to different levels of mobility, beamforming, power, and load.

In accordance with one novel aspect, a control plane architecture to integrate mmWave small cells and microwave macro cells effectively is proposed. The On-demand Reconfiguration C-Place Architecture (ORCA) for Macro-assisted Millimeter Wave (mmWave) small cells is designed to meet 5G expectations of dense deployment of small cells and UEs and beamformed intermittent Gbps links. ORCA is also designed to meet the E-UTRAN constraints of limited and costly microwave spectrum, limited macrocell processing power, backhaul link and CN capacity. Further, ORCA is designed to consider the deployment scenarios following classification criteria of connection/UE/cell density, UE mobility level, backhaul quality, and integration with macrocell-macro-assisted mmWave small cells. For example, given the limited processing resources and link capacity with existing E-UTRAN MeNB/MBS, anchoring data path and control functionalities at the MBS, as in existing HetNet DuCo or PDCP-level LTE-WiFi Aggregation, may not scale up gracefully with the 5G expectation of dense connections and small RAN latency, e.g., up to 100 connections/km$^2$ and end-to-end RAN latency as small as 1-5 ms, respectively.

The proposed ORCA revises the LTE DuCo C-plane architecture with scenario-specific and on-demand configurability. ORCA utilizes the X2-C interference but reduces inter-BS sync-up. The master BS overwrites slave or secondary BSs on configuration and UE capability negotiation, and peer-to-peer BSs have detailed functional split. ORCA redefines C-plane and RRM functional split between macrocell and smallcell for localized and fast radio control. ORCA also provides flexible (context/load) scenario based end-to-end configuration. ORCA provides UE on-demand C-plane diversity for robustness, saves the (RACH, signaling) resources at MBS, and reduces the latency between UE and SBSs.

Figure 2A:
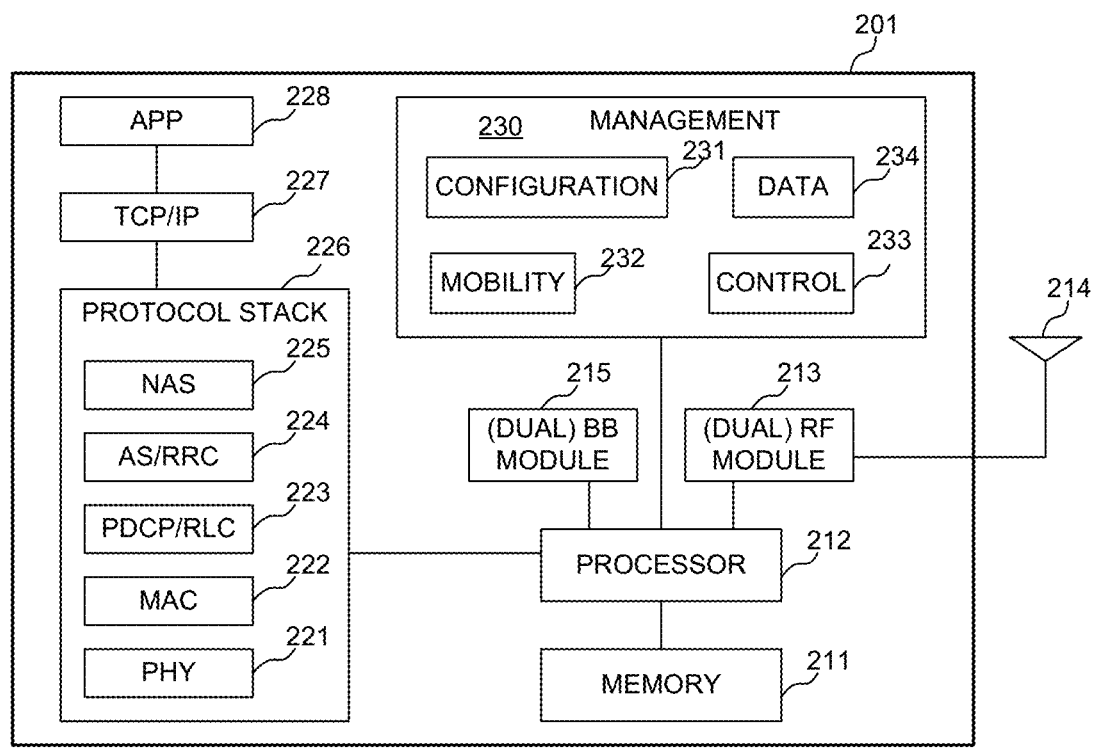
FIG. 2A is a simplified block diagram of a user equipment (UE) that carry certain embodiments of the present invention.

FIG. 2A is a simplified block diagram of a user equipment UE 201 that carry certain embodiments of the present invention. UE 201 has an antenna (or antenna array) 214, which transmits and receives radio signals. A RF transceiver module (or dual RF modules) 213, coupled with the antenna, receives RF signals from antenna 214, converts them to baseband signals and sends them to processor 212 via baseband module (or dual BB modules) 215. RF transceiver 213 also converts received baseband signals from processor 212 via baseband module 215, converts them to RF signals, and sends out to antenna 214. Processor 212 processes the received baseband signals and invokes different functional modules to perform features in UE 201. Memory 211 stores program instructions and data to control the operations of UE 201.

UE 201 also includes a 3GPP protocol stack module 226 supporting various protocol layers including NAS 225, AS/RRC 224, PDCP/RLC 223, MAC 222 and PHY 221, a TCP/IP protocol stack module 227, an application module APP 228, and a management module 230 including a configuration module 231, a mobility module 232, and a control module 233. The different circuits and modules are function circuits and modules that can be configured and implemented by software, firmware, hardware, or any combination thereof. For example, each circuit or module may comprise processor 212 plus corresponding software codes. The function circuits and modules, when executed by processor 212 (via program instructions and data contained in memory 211), interwork with each other to allow UE 201 to perform certain embodiments of the present invention accordingly. Configuration module 231 obtains C-plane setup preference information, mobility module 232 determines UE mobility based on UE speed, movement, and cell count, control module 233 determines and applies a preferred C-plane setup for the UE dynamically.

Figure 2B:
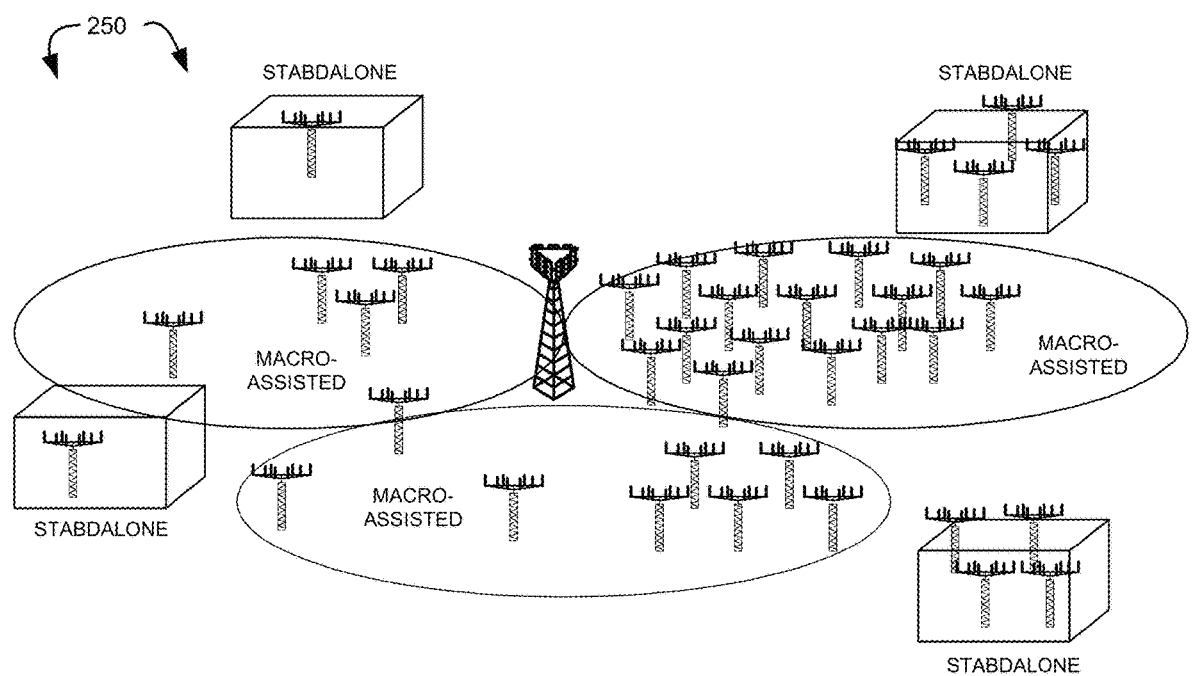
FIG. 2B illustrates mmWave smallcell deployment scenarios with ORCA.

FIG. 2B illustrates mmWave smallcell deployment scenarios with ORCA. Under the proposed ORCA, the general assumption is that E-UTRAN and 5G may coexist for a long time. The macro-assisted mmWave concept is to exploit the fact that mmWave and microwave wireless coverage may compensate each other well. Examples of 5G requirements are: Ultra Dense Network with high-density of smallcells, users per cell, and connections per area, e.g., up to 100 connections/km$^2$, with traffic density up to 10 Tbps/km$^2$; Reduced latency with end-to-end RAN delay as small as 1-5 ms; Gbps rate user experienced throughput; Rich applications with context-aware diverse QoSs and different mobility levels; and Multi-RAT support with backward compatibility and forward scalability, and multi-mode RFs at UE and BS. Generally, 5G is expected to offer 50× times more spectrum, 20× times of more density, and 10× times of higher efficiency. So far only mmWave bands can meet the first expectation.

Although mmWave small cells may work independently, macro-assisted mmWave systems offer the following potential advantages: more robust mobility support, resilience to mmWave link outage, small-area throughput boosting and wide-area signaling coverage. As a result, a new flexible, end-to-end architecture to integrate E-UTRAN and mmWave small cells is needed. Different deployment scenarios demand for different and sometimes conflicting architecture setups. Operators cannot afford a static yet inefficient architecture, nor an ever-changing architecture particularly with ever-changing hardware (UE, RAN, and EPC equipment) requirements. Operators want to have one set of HW that supports all scenarios and even futuristic scenarios at affordable cost (CAPEX/OPEX), yet offering customized services for individual users. The examples may include SDN, NFV, Centralized RAN (C-RAN) etc. Although C-plane and U-plane separation offers flexibility, but different mmWave deployment scenarios still demand for different C-plane architectures.

In light of the above, the proposed ORCA keeps the same underlying HW architecture intact, but overlay on top of it multiple logical C-plane architecture setups by on-demand software configuration. For each C-plane setup scenario, either the UE or the network operator may trigger SW (re)configuration of the architecture setup based on real-time needs, context/load situations, and UE capability. The same UE may see multiple different logical architecture setups active at different moments that corresponds to different scenarios. The same UE may see different logical architecture setups with different SBSs. Different UEs that have different (mobility, load, or context) scenarios may be configured with different logical architecture setups even if they are served by the same physical entities (MBS, SBS, MME/EPC, etc.) For each architecture setup, there could be further refined C-Plane RRM functional split between the underlying network entities. For the future mmWave deployment scenarios or evolving macrocell E-UTRAN HW, the proposed on-demand architecture may also evolve accordingly without incurring extra CAPEX/OPEX. For example, ORCA may evolve into C-RAN type of architecture easily, as C-RAN type of configuration becomes one of the embodiments of the C-plane architecture setup under ORCA.

Figure 3:
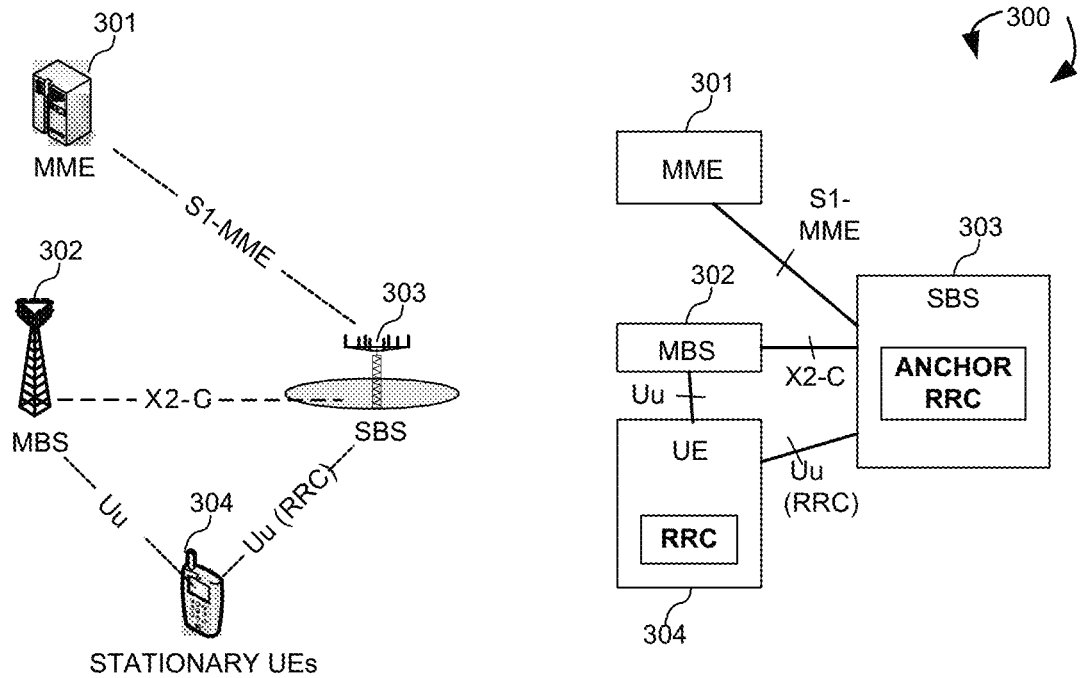
FIG. 3 illustrates a first C-Plane setup under a first network deployment scenario.

FIG. 3 illustrates a first C-Plane setup under a first network deployment scenario in HetNet 300. HetNet 300 comprises a mobility management entity MME 301, a macro base station MBS 302, an mmWave smallcell base station SBS 303, and a user equipment UE 304. UE 304 is under the coverage of both macrocell and smallcell and maintains dual connectivity with both MBS 302 and SBS 303. In this embodiment, UE 304 is a stationary UE and settles down within the SBS 303 smallcell coverage. In addition, there may be a lot of other stationary UEs and mmWave small cells densely deployed under microwave macrocell served by MBS 302. Under this deployment scenario, a first C-plane setup is applied for UE 304. In control plane, the anchor control signaling for the UE is provided by SBS 303 (e.g., via Uu (RRC) interface) and by MME 301 (e.g., via S1-MME interface). This way, control signaling for dense stationary UEs are localized in small cells, e.g., the MBS offloads the control signaling to each corresponding SBS for dense stationary UEs.

Figure 4:
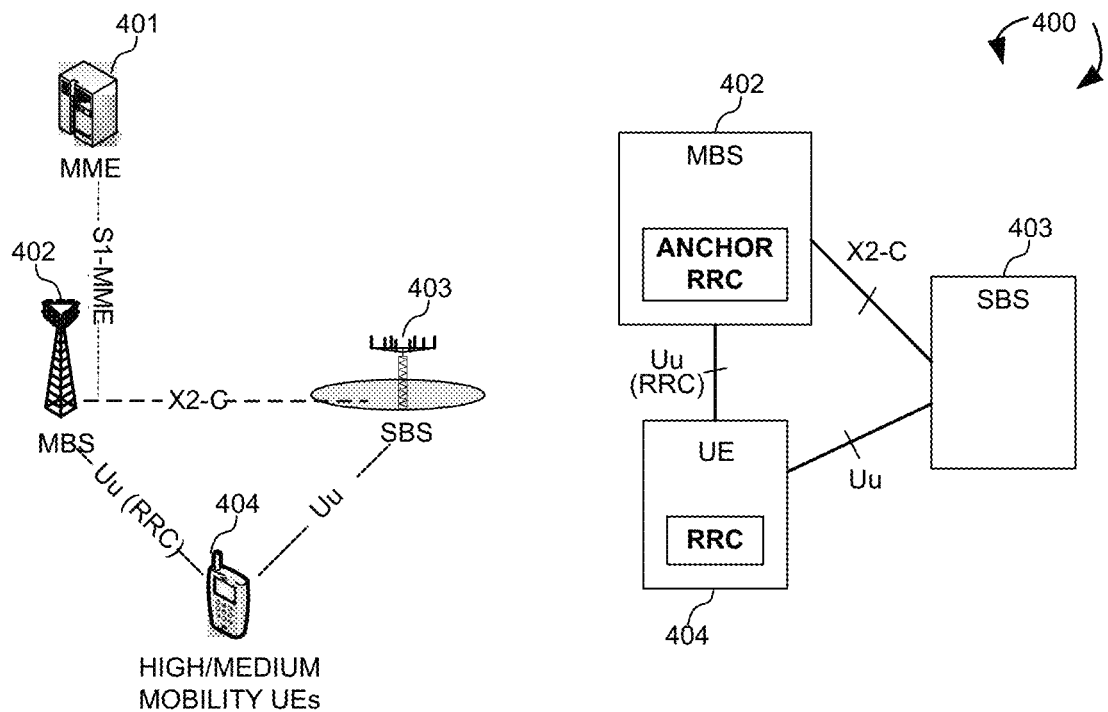
FIG. 4 illustrates a second C-Plane setup under a second network deployment scenario.

FIG. 4 illustrates a second C-Plane setup under a second network deployment scenario in HetNet 400. HetNet 400 comprises a mobility management entity MME 401, a macro base station MBS 402, an mmWave smallcell base station SBS 403, and a user equipment UE 404. UE 404 is under the coverage of both macrocell and smallcell and maintains dual connectivity with both MBS 402 and SBS 403. In this embodiment, UE 404 is a high-mobility UE and may frequently move in-and-out of the coverage of any particular mmWave smallcell. Under this deployment scenario, a second C-plane setup is applied for UE 404. In control plane, the anchor control signaling for the UE is provided by MBS 402 (e.g., via Uu (RRC) interface) and by MME 401 (e.g., via S1-MME interface). This way, robust control signaling for high-mobility UEs are provided.

Figure 5:
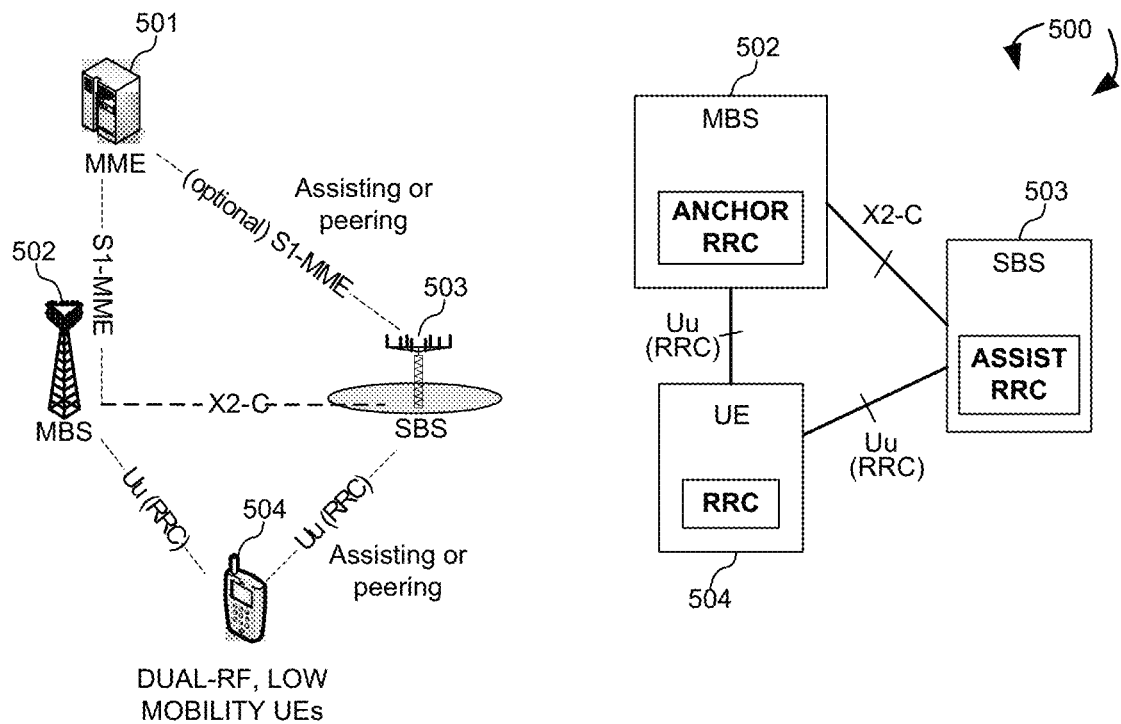
FIG. 5 illustrates a third C-Plane setup under a third network deployment scenario.

FIG. 5 illustrates a third C-Plane setup under a third network deployment scenario in HetNet 500. HetNet 500 comprises a mobility management entity MME 501, a macro base station MBS 502, an mmWave smallcell base station SBS 503, and a user equipment UE 504. UE 504 is under the coverage of both macrocell and smallcell and maintains dual connectivity with both MBS 502 and SBS 503. In this embodiment, UE 504 is a dual-RF low-mobility UE capable of supporting dual-connection signaling paths and refined RRM function split. Under this deployment scenario, a third C-plane setup is applied for UE 504. In control plane, a first anchor control signaling path for the UE is provided by MBS 502 (e.g., via Uu interface and anchor RRC) and by MME 501 (e.g., via S1-MME interface), a second assisting or peering control signaling path for the UE is provided by SBS 503 (e.g., via Uu interface and assist RRC) and by MME 501 (e.g., via assisting or peering Si-MME interface). This C-plane setup is suitable for 1) stationary UEs that start moving or when an original mmWave link degrades, or for 2) high-mobility UEs that slow down and an active mmWave link becomes operational.

Figure 6:
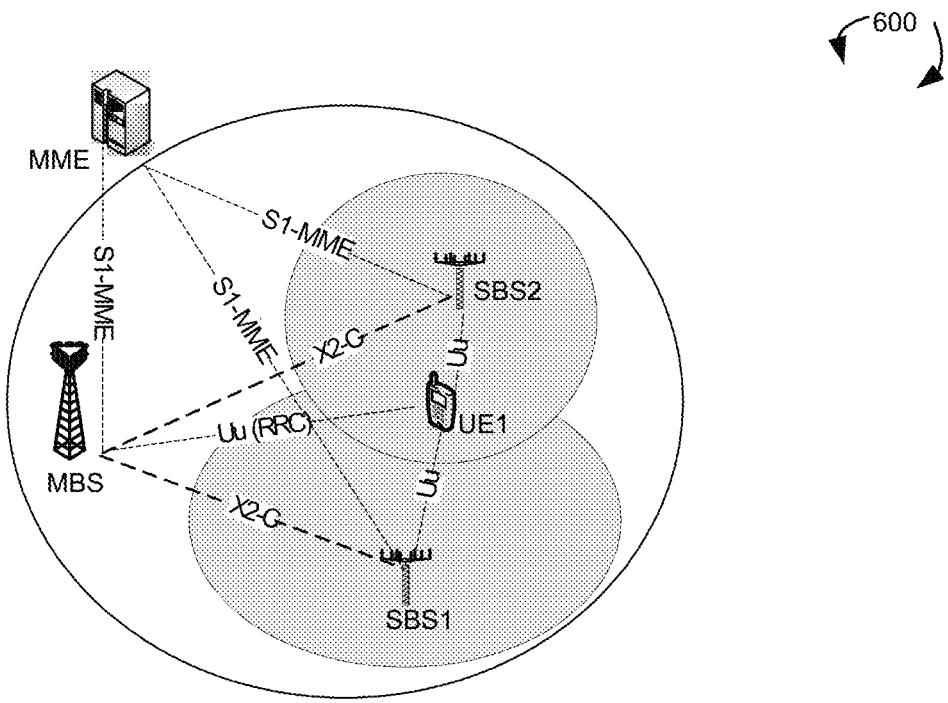
FIG. 6 illustrates an example of a UE having different C-Plane setups with different small cell base stations.

FIG. 6 illustrates an example of a UE having different C-Plane setups with different small cell base stations in a HetNet 600. HetNet 600 comprises a mobility management entity MME, a macrocell base station MBS serving microwave macrocell, a first smallcell base station SBS1 serving a first mmWave smallcell, a second smallcell base station SBS2 serving a second mmWave smallcell, and a user equipment UE1. Under ORCA, the same UE may see different logical (SW configured) architecture setups with different SBSs. In the example of FIG. 6, UE1 is in the coverage of the macrocell and both two small cells. UE1 applies the third C-plane setup with MBS and SBS1. For example, the MBS provides anchor RRC signaling to UE1 and SBS1 provides assisting RRC signaling to UE1. At the same time, UE1 applies the first C-plane setup with MBS and SBS2. For example, SBS2 provides anchor RRC signaling to UE1 and MBS offloads control signaling to SBS2.

Figure 7A:
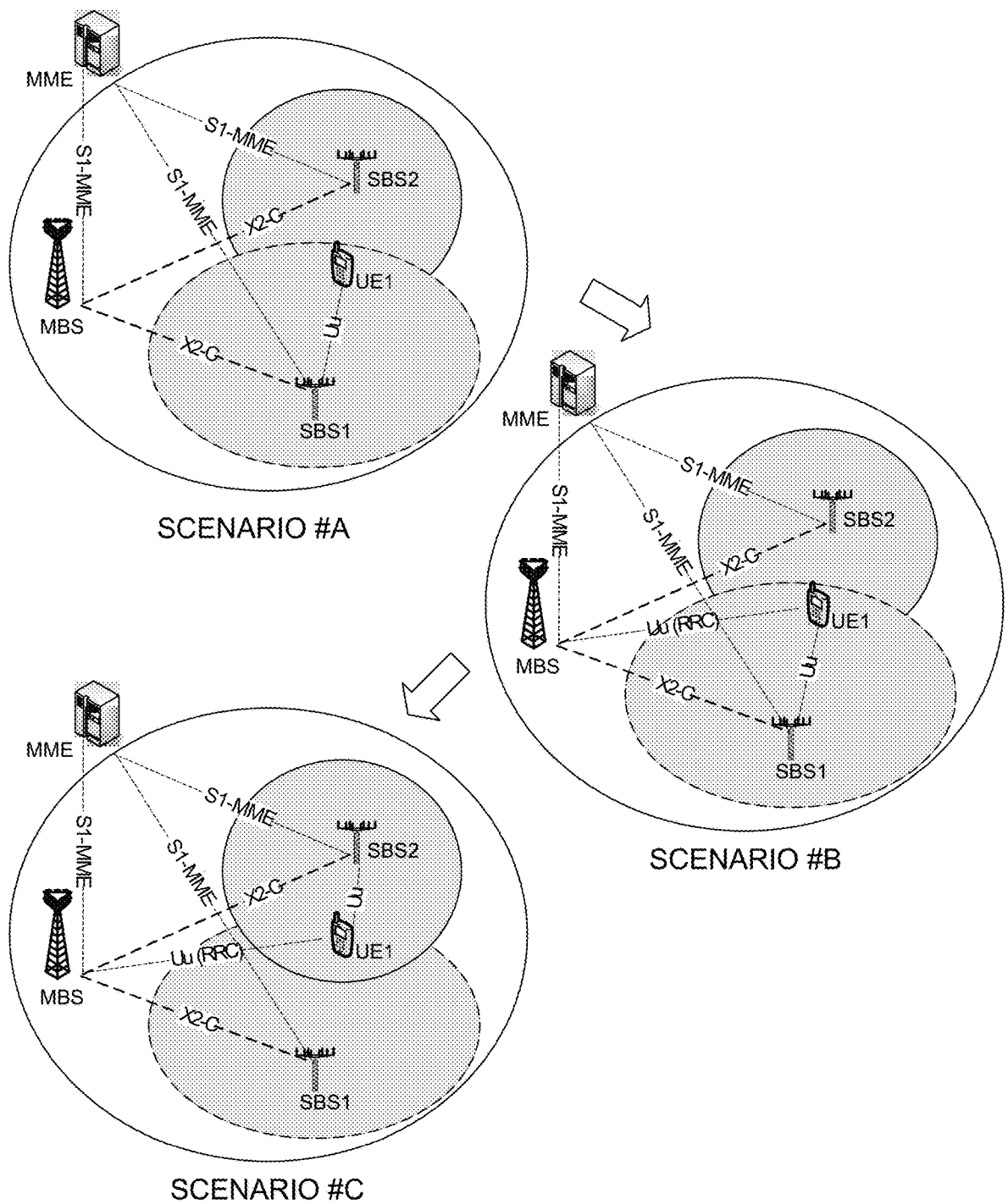
FIGS. 7A and 7B illustrate an example of a UE changing C-Plane setups.
Figure 7B:
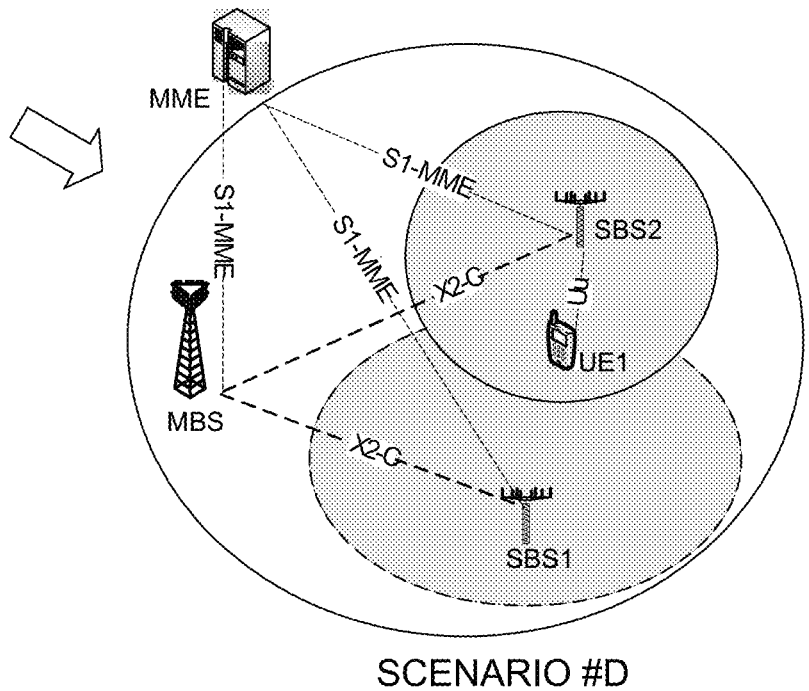
Figure 7B:
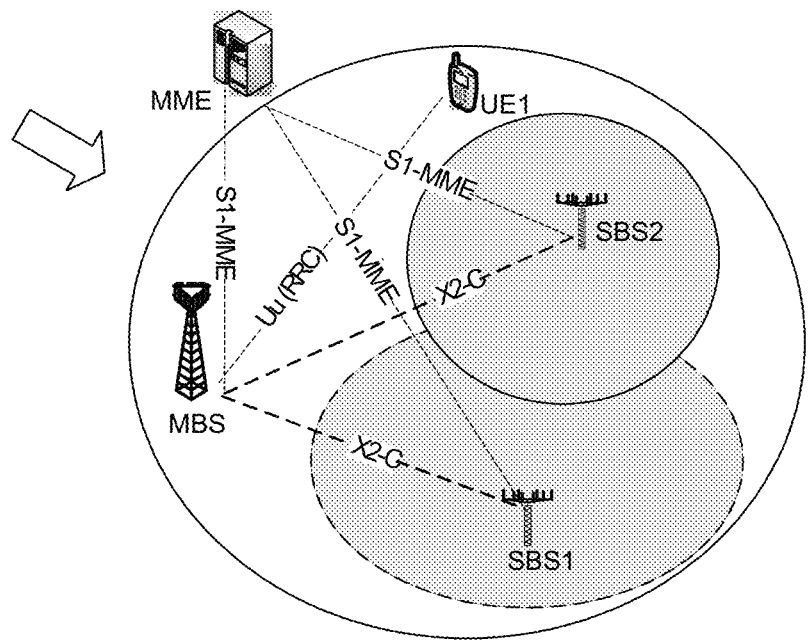

FIGS. 7A and 7B illustrate an example of a UE changing C-Plane setups in a HetNet 700. HetNet 700 comprises a mobility management entity MME, a macrocell base station MBS, a first smallcell base station SBS1, a second smallcell base station SBS2, and a user equipment UE1. Under ORCA, the same UE may see multiple different logical (SW configured) architecture setups active at different moments that corresponds to different scenarios. As depicted in FIG. 7A (SCENARIO #A), UE1 is a stationary UE located inside SBS1's coverage. UE1 applies the first C-plane setup with SBS1, i.e., SBS1 provides the anchor RRC signaling to UE1. Later, UE1 moves under SBS1's coverage, slowly across the boundary of the neighboring small cell served by SBS2 under the umbrella of the same MBS. When UE1 just starts moving and is still under SBS1's coverage (SCENARIO #B), UE1 applies the third C-plane setup with the MBS and SBS1, i.e., both MBS and SBS1 provide control signaling to UE1. When UE1 keeps moving and enters SBS2's coverage (SCENARIO #C), UE1 then applies the third C-plane setup with the MBS SBS2, i.e., both MBS and SBS2 provide control signaling to UE1. As depicted in FIG. 7B (SCENARIO #D), UE1 settles down with SBS2's coverage and becomes a stationary UE. UE1 then applies the first C-plane setup with SBS2, i.e., SBS2 provides the anchor RRC signaling to UE1. Alternatively, as depicted in FIG. 7B (SCENARIO #E), UE1 moves out of the small cells with high speed, i.e., becomes a high-mobility UE. As a result, UE1 applies the second C-plane setup with the MBS, i.e., MBS provides the anchor RRC signaling to UE1. Note that the S1-MME interface between the MME and SBS1/SBS2 can be used to speed up the mobility messaging, while the S1-MME interface between the MME and the MBS is for high-mobility UEs out of smallcell coverage. It is a network-side behavior on how to configure the S1-MME or how to sync-up among the base stations.

Figure 8:
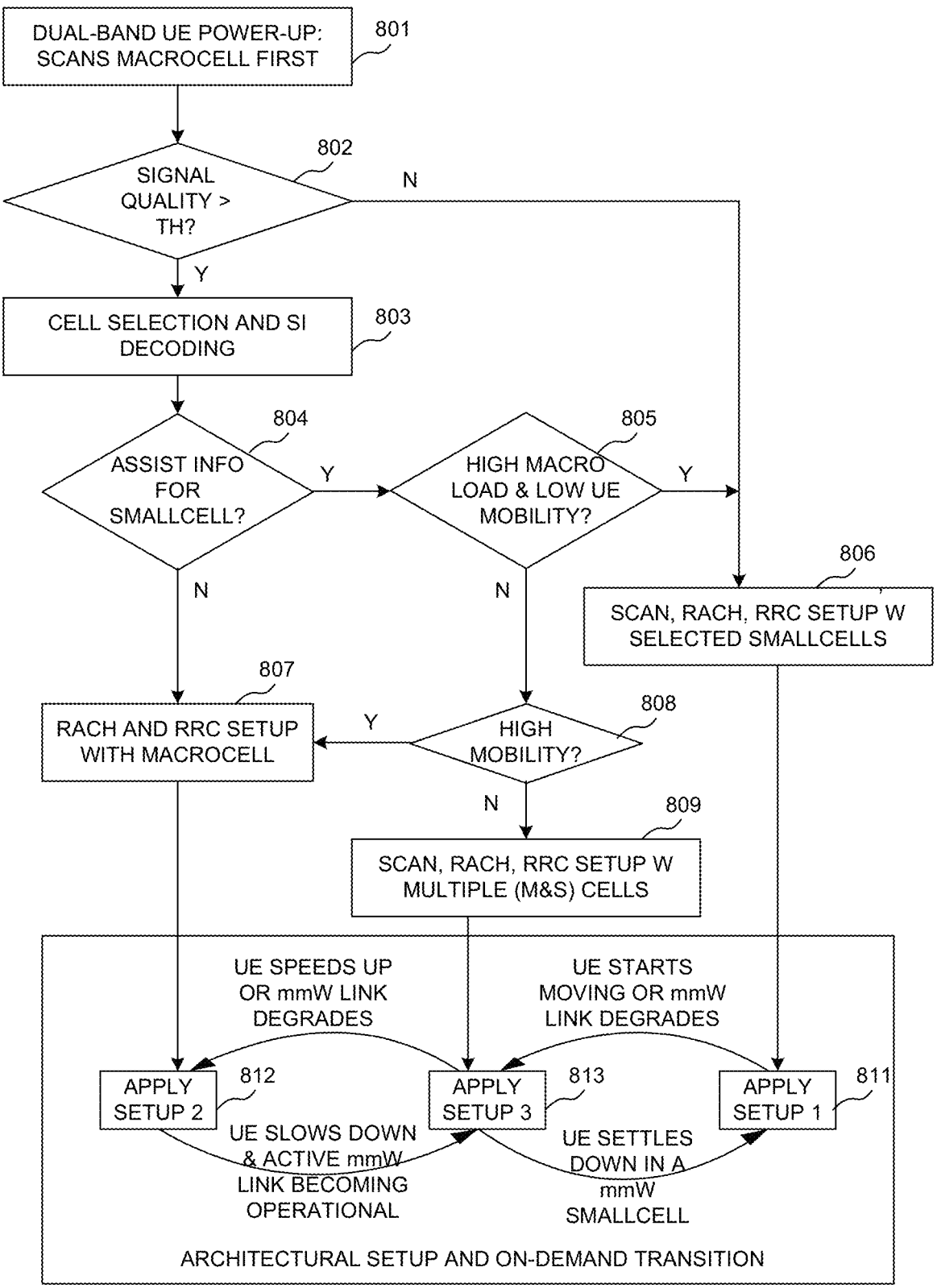
FIG. 8 illustrates UE-side configuration for C-Plane setup transition.

FIG. 8 illustrates UE-side configuration for C-Plane setup transition. Under ORCA, a UE-specific end-to-end C-plane setup can be transitioned based on UE-trigger, Network (NW)-trigger, or UE-NW jointly configuration. The initial C-plane setup can be selected by the UE based on macrocell load (e.g., RACH contention) and mmW smallcell load/beam patterns that are known to the umbrella MBS and broadcasted to the UE. On-demand C-plane setup transitions may be triggered by UE-mobility scenario changes, excessive signaling latency, timer expiry, or NW/UE real-time demand. In step 801, a dual-band UE powers up and scans microwave macrocell first. In step 802, the UE checks whether the radio signal quality in macrocell is above a threshold. If the answer is yes, then in step 803, the UE performs cell selection and system information decoding. Based on received system information, in step 804, the UE checks whether there is assistance information for small cells. If the answer is No, then in step 807, the UE performs RACH and RRC setup procedure with the macrocell and applies C-plane setup 2 in step 812. The MBS provides control signaling to the UE.

If the answer to step 802 is No, then in step 806, the UE performs scanning, RACH, RRC setup procedure with the selected small cells. In step 811, the UE applies C-plane setup 1 and receiving control signaling from the selected SBS. If the answer to step 804 is yes, then in step 805, the UE checks whether the macrocell has high load and whether the UE has low-mobility. If the answer is yes, then the UE also goes to step 806. If the answer is No, then the UE goes to step 808 and checks whether the UE has high-mobility. If the answer is yes, then the UE goes to step 807. If the answer is No, then the goes to step 809 and performs scanning, RACH, RRC setup procedure with multiple cells (macrocell by MBS and smallcell by SBS). In step 813, the UE applies C-plane setup 3 and receives anchor control signaling from MBS and assisted control signaling from SBS.

When UE is in C-plane setup 2 (step 812), if the UE slows down and an active mmWave link becomes operational, then the UE can trigger C-plane setup transition and change to setup 3 (step 813). If the UE then settles down in an mmWave smallcell, then the UE can trigger another C-plane setup transition and change to setup 1 (step 811). If the UE starts moving or if the existing mmWave link degrades, then the UE again triggers C-plane setup transition and changes back to setup 3 (step 813). Finally, if the UE speeds up or if the existing mmWave link degrades, then the UE triggers another C-plane setup transition and change to setup 2 (step 812).

Figure 9:
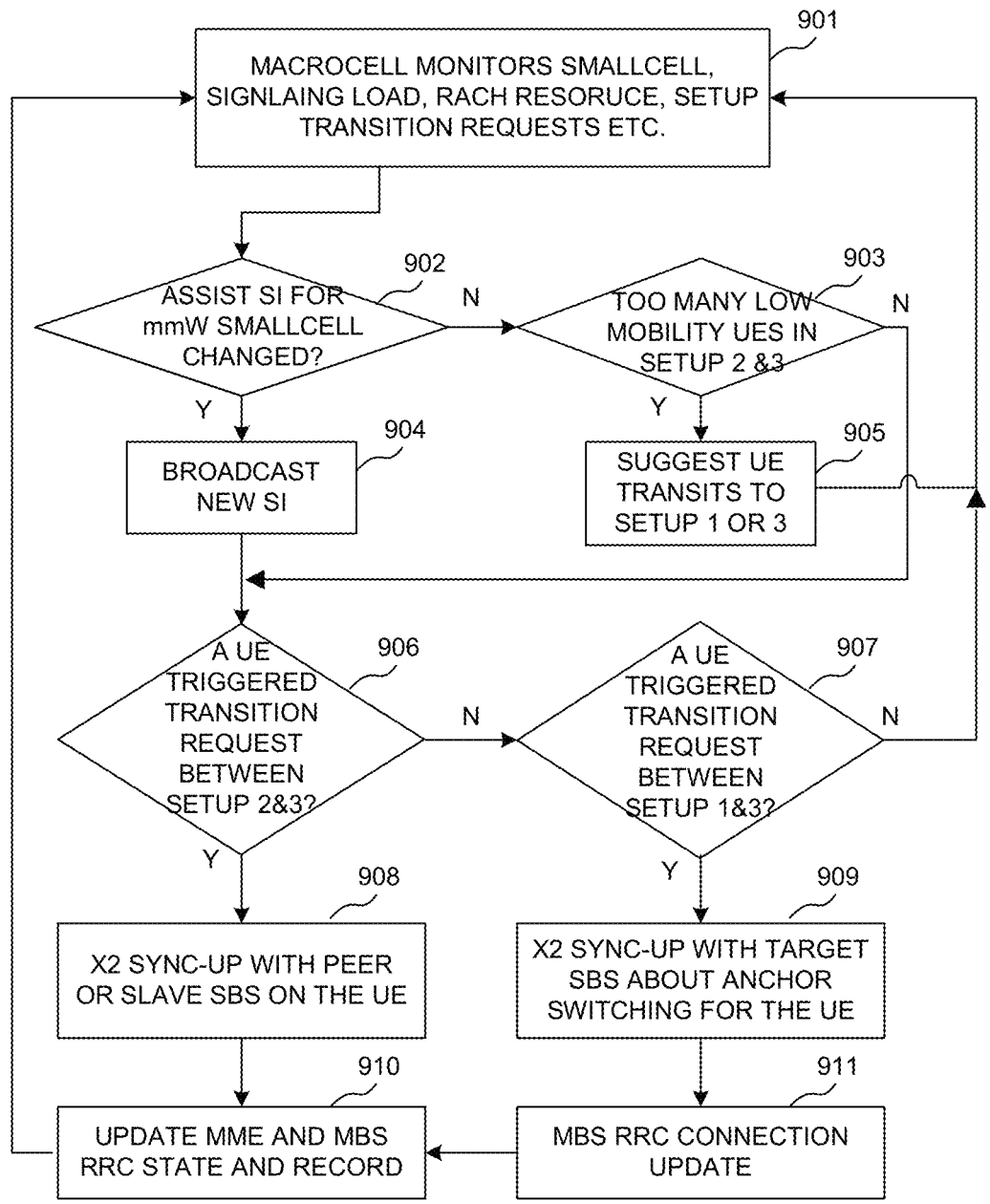
FIG. 9 illustrates network-side configuration and macrocell operation for C-Plane setup transition.

FIG. 9 illustrates network-side configuration and macrocell operation for C-Plane setup transition. Under ORCA, a UE-specific end-to-end C-plane setup can be suggested by the network-side serving BS in macrocell or small cells. Any conflict can be resolved by macro and small cell sync-up across C2 or MME, and eventually depends on UE's final decision (in one embodiment). From NW-side macrocell operation perspective, in step 901, the MBS monitors small cell addition, removal, or modification, signaling load, RACH resources, and C-plane setup transition request from the UE, etc. In step 902, the MBS checks whether the assistance system information for mmWave small cells has changed. If the answer is yes, then in step 904, the MBS broadcasts updated new system information to the UEs and goes to step 906. In step 906, the MBS checks whether a UE has triggered transition request between C-plane setup 2 and setup 3. If the answer is yes, then in step 908, the MBS performs X2 sync-up with its peer or slave SBS on the UE and then updates MME and macrocell RRC state and record in step 910. The MBS then goes back to step 901 repeating the operation.

If the answer to step 902 is No, then in step 903, the MBS checks whether there is too many low-mobility UEs in C-plane setup 2 and setup 3. If the answer is No, then the MBS goes to step 906 directly. If the answer is yes, then the MBS goes to step 905 and suggests the UE to transition to C-plane setup 1 or setup 3 and then goes back to step 901.

If the answer to step 906 is No, then in step 907, the MBS checks whether a UE has triggered transition request between C-plane setup 1 and setup 3. If the answer is no, then the MBS goes back to step 901. If the answer is yes, then the MBS goes to step 909 and performs X2 sync-up with the target SBS about anchor RRC switching for the UE. In step 911, the MBS performs RRC connection update. Finally, the MBS updates MME and macrocell RRC state and record in step 910. The MBS then goes back to step 901 repeating the operation.

Figure 10:
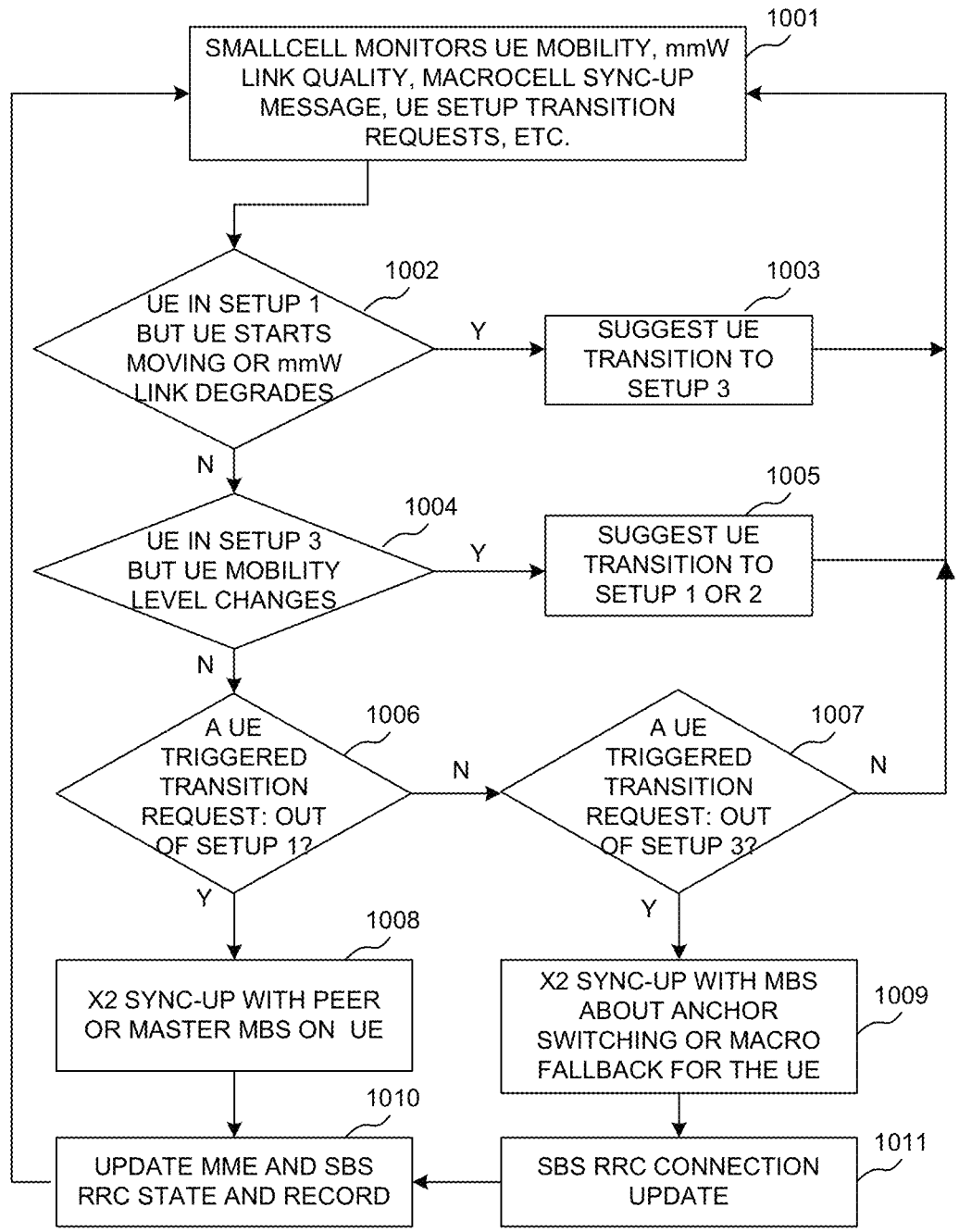
FIG. 10 illustrates network-side configuration and smallcell operation for C-Plane setup transition.

FIG. 10 illustrates network-side configuration and smallcell operation for C-Plane setup transition. Under ORCA, a UE-specific end-to-end C-plane setup can be suggested by the network-side serving BS in macrocell or small cells. Any conflict can be resolved by macro and small cell sync-up across C2 or MME, and eventually depends on UE's final decision (in one embodiment). From NW-side smallcell operation perspective, in step 1001, an SBS monitors UE mobility, mmWave link quality, macrocell sync-up message, UE C-plane setup transition requests etc. In step 1002, the SBS checks whether a UE in setup 1 starts moving or the mmWave link degrades. If the answer is no, then the SBS checks whether a UE in setup 3 but its mobility level changes. If the answer is no. then the SBS further checks whether a UE has triggered C-plane transition request to get out of setup 2. If the answer is yes, then the SBS performs X2 sync-up with its peer or master MBS on the UE and then updates MME and smallcell RRC state and record in step 1010. The SBS then goes back to step 1001 repeating the operation.

If the answer to step 1002 is yes, then in step 1003, the SBS suggests the UE to transition to C-plane setup 3 and then goes back to step 1001. If the answer to step 1004 is also yes, then in step 1005, the SBS suggests the UE to transition to C-plane setup 1 or setup 2 and then goes back to step 1001.

If the answer to step 1006 is no, then in step 1007, the SBS checks whether a UE has triggered C-plane transition request to get out of setup 3. If the answer is no, then the SBS goes back to step 1001. If the answer is yes, then the MBS goes to step 1009 and performs X2 sync-up with the MBS about anchor RRC switching or macro fallback for the UE. In step 1011, the SBS performs RRC connection update. Finally, the SBS updates MME and smallcell RRC state and record in step 1010. The SBS then goes back to step 1001 repeating the operation.

Figure 11:
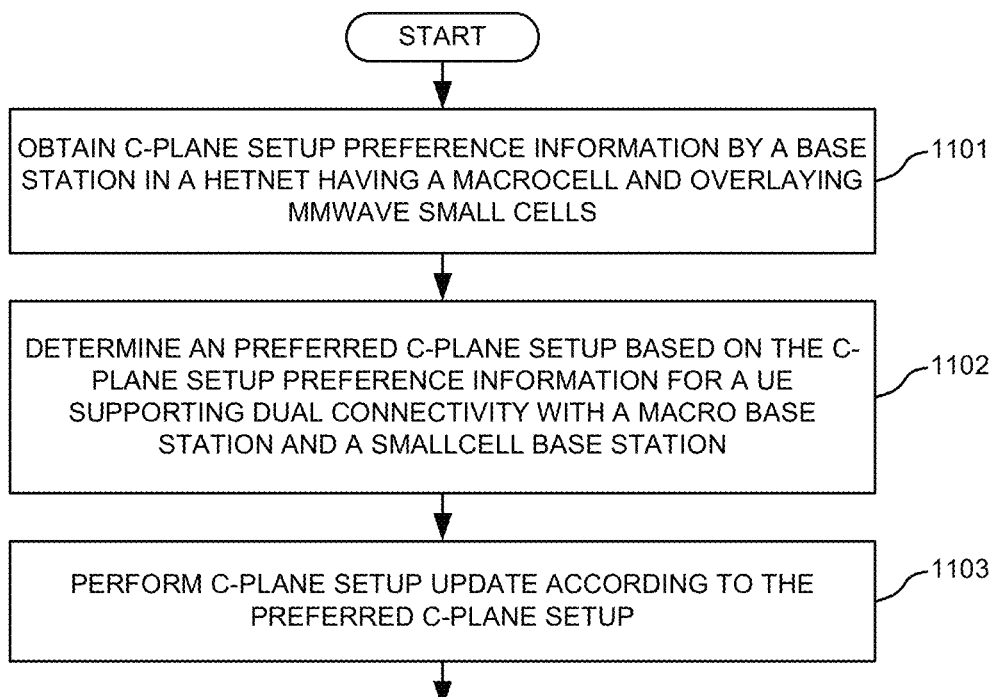
FIG. 11 is a flow chart of a method of ORCA for Macro-assisted Millimeter Wave (mmWave) small cells from UE perspective in accordance with one novel aspect.

FIG. 11 is a flow chart of a method of ORCA for Macro-assisted Millimeter Wave (mmWave) small cells from network perspective in accordance with one novel aspect. In step 1101, a base station obtains C-plane setup preference information in a HetNet having a macrocell and overlaying mmWave small cells. In step 1102, the base station determines an updated C-plane setup based on the C-plane setup preference information for a UE having dual connectivity with a macro base station and a smallcell base station. In step 1103, the base station performs C-plane setup update according to the updated C-plane setup of the UE. In one embodiment, the C-plane setup preference information comprises at least one of a smallcell addition and removal and modification, a signaling load, a network density, available radio access resources, link quality of the macrocell and small cells, a UE mobility, and a C-plane setup transition request from the UE. A specific C-plane setup comprises one or more base stations that perform radio resource control (RRC) and radio resource management (RRM) functionalities for the UE. The C-plane setup update involves performing X2 sync and RRC connection update between the MBS and the SBS. The updated C-plane setup is dynamically applied via software configuration based on the same set of hardware in the network.

Figure 12:
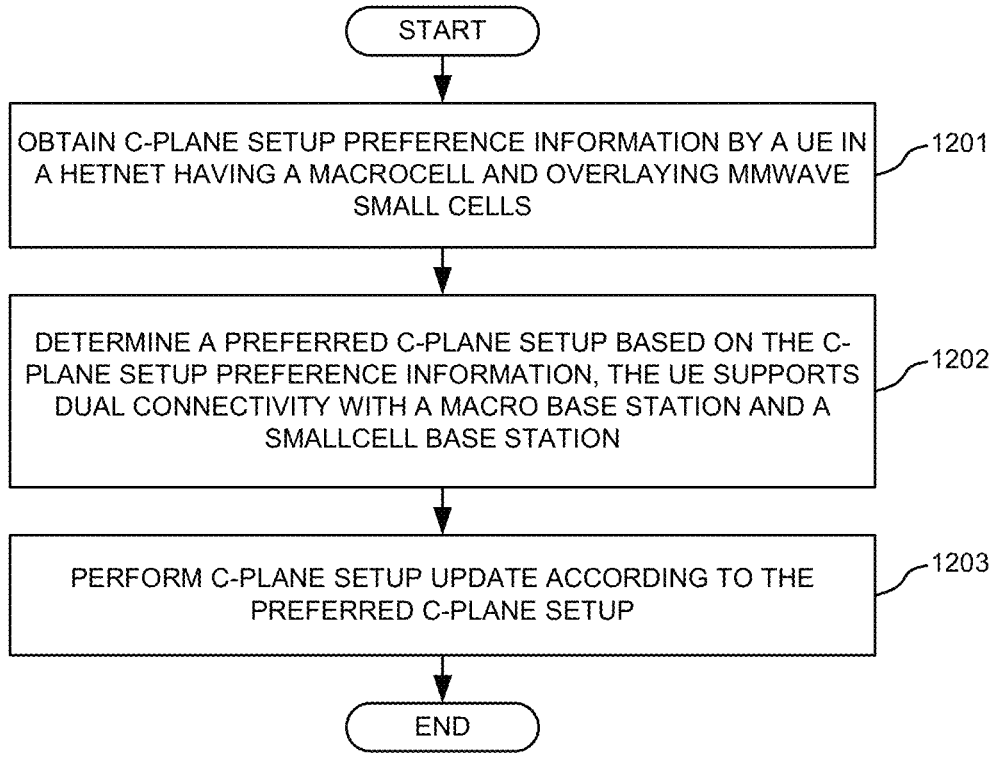
FIG. 12 is a flow chart of a method of ORCA for Macro-assisted Millimeter Wave (mmWave) small cells from network perspective in accordance with one novel aspect.

FIG. 12 is a flow chart of a method of ORCA for Macro-assisted Millimeter Wave (mmWave) small cells from UE perspective in accordance with one novel aspect. In step 1201, a UE obtains C-plane setup preference information in a HetNet having a macrocell and overlaying mmWave small cells. In step 1202, the UE determines an updated C-plane setup based on the C-plane setup preference information. The UE maintains dual connectivity with a macro base station and a smallcell base station. In step 1203, the UE performs C-plane setup update according to the updated C-plane setup of the UE. The C-plane setup preference information comprises a UE mobility and assistance information from the network. A specific C-plane setup comprises one or more base stations that perform radio resource control (RRC) and radio resource management (RRM) functionalities for the UE. In one embodiment, the updated C-plane setup is different from a previously applied C-plane setup for the same UE. In another embodiment, the updated C-plane setup associated with the SBS is different from a second C-plane setup associated with a second SBS for the same UE at the same time.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method comprising:
    obtaining control-plane (C-plane) setup preference information by a base station in a heterogeneous network (HetNet) having a microwave macrocell and overlaying Millimeter Wave (mmWave) small cells;
    determining a preferred C-plane setup based on the obtained C-plane setup preference information for a user equipment (UE) supporting dual connectivity with a macro base station (MBS) and a smallcell base station (SBS), wherein the C-plane setup preference information comprises UE mobility information or link quality of the macrocell and small cells; and
    performing C-plane setup update according to the preferred C-plane setup that is determined based on the UE mobility information or link quality of the macrocell and small cells, and wherein the C-plane setup update involves updating one or more Radio Resource Control (RRC) signaling paths for the UE.
2. The method of claim 1, wherein the C-plane setup preference information further comprises at least one of a smallcell addition and removal and modification, a signaling load, a network density, available radio access resources, and a C-plane setup transition request from the UE.
3. The method of claim 1, wherein a C-plane setup comprises one or more base stations that perform radio resource control (RRC) and radio resource management (RRM) functionalities for the UE.
4. The method of claim 1, wherein a first C-plane setup is applied for the UE, wherein anchor control signaling is provided by the SBS, and wherein the UE has stationary to low mobility.

5. The method of claim 1, wherein a second C-plane setup is applied for the UE, wherein anchor control signaling is provided by the MBS, and wherein the UE has medium to high mobility.

6. The method of claim 1, wherein a third C-plane setup is applied for the UE, wherein control signaling is provided by both the MBS and the SBS, and wherein the UE has low to medium mobility.

7. The method of claim 1, wherein the C-plane setup update involves performing X2 sync and radio resource control (RRC) and radio resource management (RRM) update between the MBS and the SBS.

8. The method of claim 1, wherein the preferred C-plane setup is applied via software configuration based on the same set of hardware in the network.

9. A method, comprising:
- obtaining control-plane (C-plane) setup preference information by a user equipment (UE) in a heterogeneous network (HetNet) having a microwave macrocell and overlaying Millimeter Wave (mmWave) small cells;
- determining a preferred C-plane setup for the UE based on the obtained C-plane setup preference information, wherein the UE supports dual connectivity with a macro base station (MBS) and a smallcell base station (SBS), wherein the C-plane setup preference information comprises UE mobility information or link quality of the macrocell and small cells; and
- performing C-plane setup update according to the preferred C-plane setup that is determined based on the UE mobility information or link quality of the macrocell and small cells, and wherein the C-plane setup update involves updating one or more Radio Resource Control (RRC) signaling paths for the UE.

10. The method of claim 9, wherein the C-plane setup preference information further comprises at least one of a channel condition, a UE throughput, UE context information, network assistance information, and a network request.

11. The method of claim 9, wherein a C-plane setup comprises one or more base stations that perform radio resource control (RRC) and radio resource management (RRM) functionalities for the UE.

12. The method of claim 9, wherein the preferred C-plane setup is different from a previously applied C-plane setup for the same UE.

13. The method of claim 9, wherein the preferred C-plane setup associated with the SBS is different from a second C-plane setup associated with a second SBS for the same UE at the same time.

14. The method of claim 9, wherein the UE has stationary to low mobility and applies a first C-plane setup, and wherein the UE receives control signaling from the SBS.

15. The method of claim 9, wherein the UE has medium to high mobility and applies a second C-plane setup, and wherein the UE receives control signaling from the MBS.

16. The method of claim 9, wherein the UE has low to medium mobility and applies a third C-plane setup, and wherein the UE receives control signaling from both the MBS and the SBS.

17. A user equipment (UE), comprising:
- a configuration module that obtains control-plane (C-plane) setup preference information in a heterogeneous network (HetNet) having a microwave macrocell and overlaying Millimeter Wave (mmWave) small cells;
- a first radio frequency (RF) module that communicates with a macro base station (MBS);
- a second radio frequency (RF) module that communicates with a smallcell base station (SBS); and
- a control module that determines a preferred C-plane setup for the UE based on the obtained C-plane setup preference information comprising UE mobility information or link quality of the macrocell and small cells and performs C-plane setup update according to the preferred C-plane setup that is determined based on the UE mobility information or link quality of the macrocell and small cells, and wherein the C-plane setup update involves updating one or more Radio Resource Control (RRC) signaling paths for the UE.

18. The UE of claim 17, wherein the C-plane setup preference information further comprises at least one of a channel condition, a UE throughput, UE context information, network assistance information, and a network request.

19. The UE of claim 17, wherein a C-plane setup comprises one or more base stations that perform radio resource control (RRC) and radio resource management (RRM) functionalities for the UE.

20. The UE of claim 17, wherein the preferred C-plane setup is different from a previously applied C-plane setup for the same UE.

21. The UE of claim 17, wherein the preferred C-plane setup associated with the SBS is different from a second C-plane setup associated with a second SBS for the same UE at the same time.

22. The UE of claim 17, wherein the UE has stationary to low mobility and applies a first C-plane setup, and wherein the UE receives control signaling from the SBS.

23. The UE of claim 17, wherein the UE has medium to high mobility and applies a second C-plane setup, and wherein the UE receives control signaling from the MBS.

24. The UE of claim 17, wherein the UE has low to medium mobility and applies a third C-plane setup, and wherein the UE receives control signaling from both the MBS and the SBS.

* * * * *